United States Patent [19]

Ogata et al.

[11] 4,366,516

[45] Dec. 28, 1982

[54] PRECISION MACHINERY COMPONENT

[75] Inventors: Masatsugu Ogata; Hideki Asano; Tsuneo Narusawa, all of Hitachi; Toshikazu Narahara, Tokaimura, all of Japan

[73] Assignee: Hitachi, Ltd., Tokyo, Japan

[21] Appl. No.: 153,007

[22] Filed: May 27, 1980

[30] Foreign Application Priority Data

May 29, 1979 [JP] Japan .................................. 54-66591
May 29, 1979 [JP] Japan .................................. 54-66592

[51] Int. Cl.³ .......................... G11B 15/60; G11B 5/10
[52] U.S. Cl. ....................................... 360/84; 360/129; 360/130.24
[58] Field of Search ............... 360/84, 85, 129, 130.24

[56] References Cited

U.S. PATENT DOCUMENTS 3,899,795 8/1975 Watanabe ........................... 360/137
4,200,895 4/1980 Repp ..................................... 360/84

Primary Examiner—Robert S. Tupper
Attorney, Agent, or Firm—Thomas E. Beall, Jr.

[57] ABSTRACT

Precision machinery components such as a cylinder in a magnetic tape scanning apparatus, a cylinder base and/or a sub-chassis in a video tape recorder, etc. made of cured thermosetting resin composition comprising (A) a resin component comprising, particularly preferably, a terephthalic acid series unsaturated polyester resin, styrene and a saturated polyester resin, (B) an inorganic filler, and (C) short fibrous material such as carbon short fibers, have excellent dimensional accuracy and dimensional stability. When these precision machinery components are used, for example, in a video tape recorder, the same clear VTR picture as in the case of using those made of metal can be obtained.

23 Claims, 14 Drawing Figures

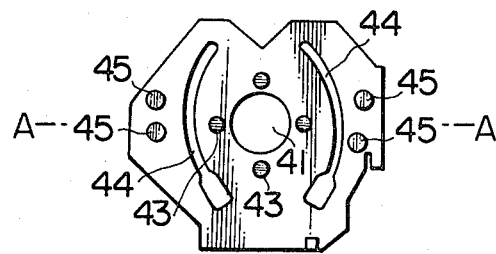
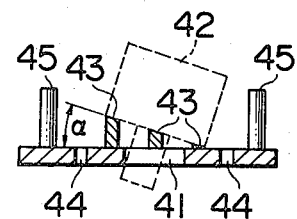
FIG. 7a  FIG. 7b
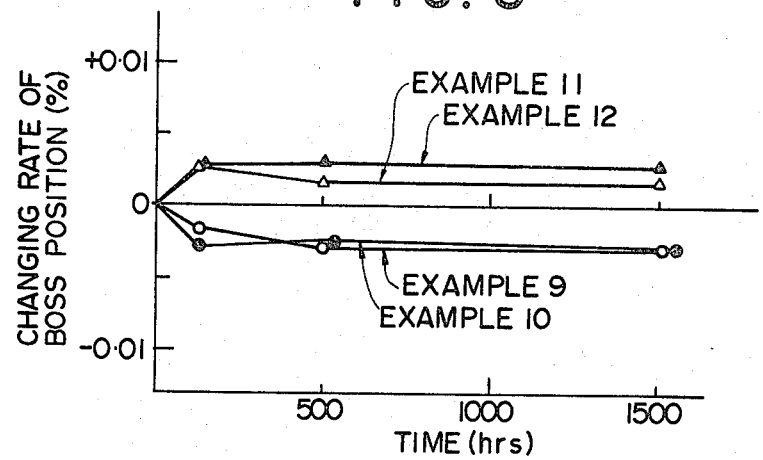
FIG. 8
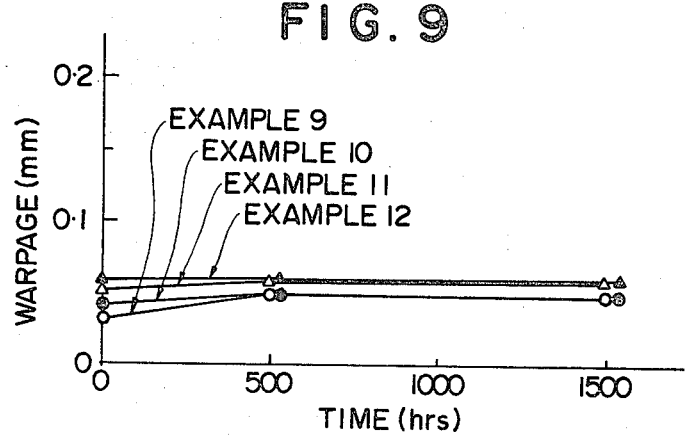
FIG. 9

PRECISION MACHINERY COMPONENT

BACKGROUND OF THE INVENTION

This invention relates to precision machinery components formed by using a special thermosetting resin composition.

Precision machinery components which require high dimensional accuracy and dimensional stability have been made of metal in most cases. But in order to conduct precision working of metals, various apparatuses and high techniques for cutting and surface finishing are necessary. Further, in the working of parts having complicated forms, complicated working procedures and long working time are necessary, which results in making the production cost high.

Thus, in order to remove such defects mentioned above as well as for weight saving, various machinery components have recently been made of plastics. For example, electrical parts, automotive parts, and various parts of machines and instruments are made of various thermosetting resins such as phenolic resins, melamine resin, urea resin, epoxy resins, unsaturated polyester resins, silicone resin, polyimide resins, and the like, or of various thermoplastic resins such as polyethylene, polystyrene, polyvinyl chloride, polymetharylates, nylons, polycarbonates, polyphenylene oxide, polyphenylene sulfide, polyethylene terephthalate, polybutylene terephthalate, and the like, or of those filled with inorganic fillers or those reinforced with fibrous reinforcing materials. Since the resinous materials mentioned above can easily be formed into the desired shapes by using injection or transfer molding machines, the processing cost is very cheap.

But since shaped articles made of various plastics mentioned above are inferior to those made of metals in mechanical strength, thermal conductivity, electrical conductivity, dimensional accuracy, durability, and the like, utility of them is very limited. For example, a cylinder used in the magnetic tape scanning apparatus of a video tape recorder requires remarkably high dimensional accuracy and dimensional stability, so that it is generally made of metal such as aluminumsilicon alloy and it has been believed that such a cylinder which requires high dimensional accuracy and dimensional stability can hardly be made of plastics, since roundness of the cylinder would be changed greatly with the lapse of time under heating conditions.

None the less, precision machinery components made of plastics, particularly thermosetting resins, have been demanded from the viewpoint of weight saving and reduction in production cost.

SUMMARY OF THE INVENTION

It is an object of this invention to provide precision machinery components made of plastics, particularly cured thermosetting resins, having high dimensional accuracy and dimensional stability with small cure shrinkage and excellent physical properties. Such precision machinery components can be formed by curing a thermosetting resin composition comprising (A) a thermosetting resin, (B) an inorganic filler and (C) an antistatic agent or a reinforcing material.

BRIEF DESCRIPTION OF THE DRAWINGS

FIG. 7 (a) is a plan view and 7 (b) is a side view of a subchassis and cylinder base molded into one piece.

FIG. 8 is a graph showing changing rate of boss position with the lapse of time.

FIG. 9 is a graph showing warpage of the sub-chassis with the lapse of time.

DETAILED DESCRIPTION OF THE INVENTION

Figure 2:
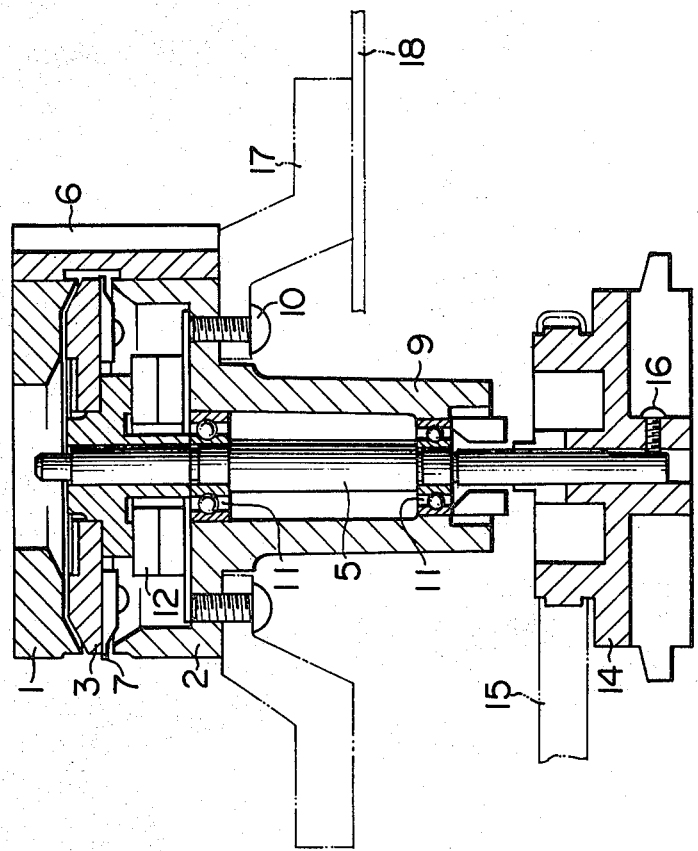
FIGS. 2 and 3 are cross sectional views of different types of magnetic tape scanning apparatuses.

The thermosetting resin used as the component (A) is preferably that having a glass transition point of higher than 90° C. when cured in order to prevent thermal deformation during the use.

Among various thermosetting resins, the combination of an unsaturated polyester resin, a cross-linking agent and a thermoplastic resin having good affinity to the unsaturated polyester resin is preferable.

The most preferable unsaturated polyester resin is a terephthalic acid series unsaturated polyester. The terephthalic acid series unsaturated polyester can be produced by using as the saturated dicarboxylic acid component terephthalic acid, dimethyl terephthalate, etc., as the unsaturated dicarboxylic acid maleic acid, maleic anhydride, fumaric acid, chloromaleic acid, dichloromaleic acid, etc., and as the glycol component ethylene glycol, diethylene glycol, propylene glycol, neopentyl glycol, 1,4-butanediol, 1,3-butanediol, 2,3-butanediol, dipropylene glycol, triethylene glycol, 1,5-pentanediol, 1,6-hexanediol, 2,2,4-trimethylpentanediol-1,3-hydrogenated bisphenol A, 2,2-di(4-hydroxypropoxyphenyl)propane, glycerin, trimethylene glycol, 2-ethyl-1,3-hexanediol, etc. The reason of using the terephthalic acid series unsaturated polyester as the unsaturated polyester is that it has various good physical properties, heat resistance, due to its excellent crystallizability. In phthalic acid series unsaturated polyesters, the amount of the unsaturated dicarboxylic acid is increased so as to enhance reactivity in order to improve curing characteristics and the effect of an agent for lowering shrinkage, but properties of the resin is lowered by the increased amount of the unsaturated dicarboxylic acid. On the contrary, in the case of the terephthalic acid series unsaturated polyester, low shrinkage can easily attained due to remarkably high reactivity without increasing the amount of the unsaturated dicarboxylic acid, which results in maintaining good physical properties.

As the crosslinking agent, styrene, monomer is preferably used.

As the thermoplastic resin having good affinity to the unsaturated polyester, there can be used polystyrene, polyethylene, poly(methyl methacrylate), polyvinyl chloride, polyvinyl acetate, and the like, but when a terephthalic acid series unsaturated polyester is used, the use of a saturated polyester, particularly an isophthalic acid series saturated polyester is preferable from the viewpoint of compatibility. The isophthalic acid series saturated polyester can be produced by using as the saturated dicarboxylic acid component isophthalic acid and as the glycol component ethylene glycol, diethylene glycol, propylene glycol, neopentyl glycol, etc.

The isophthalic acid series saturated polyester has good compatibility with the mixture of the terephthalic acid series unsaturated polyester and styrene and good effect for lowering shrinkage of the terephthalic acid series unsaturated polyester-styrene mixture.

The inorganic filler used as the component (B) has effects for lowering mold shrinkage, coefficient of thermal expansion, and creep characteristics and increasing thermal conductivity. Examples of the inorganic filler are calcium carbonate, clay, talc, silica sand, silica powder, silica glass powder, zircon, mica powder, alumina powder borax, aluminum hydroxide, gypsum, dawsonite, magnesium hydroxide, and the like. Among them, those having a particle size of 44 $\mu$m or less are preferable. In order to improve smoothness and gloss of molded articles, it is more preferable to use inorganic fillers having a particle size of 1 $\mu$m or less as a portion of the inorganic filler. When the particle size is larger than 44 $\mu$m, there is an undesirable tendency to lower smoothness and gloss of molded articles.

As the antistatic agent, the component (C), there can be used carbon fibers, carbon powder or graphite powder. Particularly, the use of carbon fibers having fiber length of 6 mm or less is preferable for lowering mold shrinkage and coefficient of thermal expansion of molded articles and for improving thermal conductivity of molded articles and is remarkably effective for improving creep characteristics of molded articles. When carbon or graphite powder is used, inorganic or organic short fibers such as glass fibers, asbestos, ceramic fibers, potassium titanate fibers, nylon fibers, vinylon fibers, cellulose fibers, polyamide fibers having fiber length of preferably 6 mm or less can preferably be used together as reinforcing material.

The thermosetting resin composition may contain a curing catalyst for the terephthalic acid series unsaturated polyester-styrene mixture. Examples of the curing catalyst are organic peroxides such as parachlorobenzoyl peroxide, methyl ethyl ketone peroxide, cyclohexanone peroxide, bis(1-hydroxycyclohexyl peroxide), hydroxyheptyl peroxide, cumene hydroperoxide, dicumyl peroxide, 2,5-dimethyl-2,5-di(t-butylperoxy)hexane, 1,1-bis(t-butylperoxy)-3,3,5-trimethylcyclohexane, t-butyl perbenzoate, and the like. These peroxides may be used alone or as a mixture thereof.

The thermosetting resin composition may further contain, if necessary, other additives such as one or more releasing agents, coupling agents, surface active agents, thickening agents, colorants, and the like.

Preferable proportions of individual components in the thermosetting resin composition are as follows. As to the resin component (A), the terephthalic acid series unsaturated polyester and styrene are used in weight ratio of the former to the latter 60/40 to 40/60, the total being 100. If the amount of styrene is too small, it is difficult to attain low shrinkage, while if the amount of styrene is too much, there easily takes place separation among the resin component, the filler and the carbon fiber during the molding of the molding composition, which results in lowering in dimensional accuracy and dimensional stability of molded articles. The weight ratio of the mixture of the terephthalic acid series unsaturated polyester and styrene to the saturated polyester is in the range of 85/15 to 75/25, the total being 100. If the amount of the saturated polyester is too small, mold shrinkage becomes larger, while if the amount is too large, thermal resistance and creep characteristics of molded articles are lowered so as to give undesirable influence on dimensional stability. The resin component (A) is used in an amount of 20 to 30% by weight based on the total weight of the thermosetting resin composition, i.e. the molding material.

The inorganic filler (B) is used in an amount of 60 to 70% by weight based on the total weight of the thermosetting resin composition. If the amount of the inorganic filler is too small, mold shrinkage and coefficient of thermal expansion become larger and creep characteristics and thermal conductivity are lowered undesirably. On the other hand, if the amount of the inorganic filler is too large, a viscosity of the mixture with the resin component increases to make the mixing with short fibrous material (C) such as carbon fibers difficult and molding of articles having complicated shape or thin portions becomes difficult due to poor fluidity of the molding material.

The component (C) such as carbon fibers is used in an amount of 5 to 15% by weight based on the total weight of the thermosetting resin composition. If the amount of the component (C) is too small, coefficient of thermal expansion of molded articles decreases and improving effect on creep characteristics becomes little, while if the amount is too large, mixing with the resin component (A) and the filler (B) becomes difficult and moldability of the molding material is remarkably lowered. When removal of undesirable effect of static electricity is required, the antistatic agent such as carbon fibers is used so that surface resistance becomes $10^9$ $\Omega$-cm or less.

The thermosetting resin composition may contain the curing catalyst in an amount of 1 to 2% by weight and other additives such as releasing agents, surface active agents, coupling agents, thickening agents, colorants, etc. in an amount of 0.1 to 2% by weight.

The thermosetting resin composition may be prepared by using a conventional method, for example, by using a kneader. More concretely, to a mixture of the resin component (A) and the filler (B) previously mixed sufficiently, the component (C) such as carbon short fibers are added and kneaded. In such a case, since the carbon fibers are easily damaged, much care should be taken for determining kneading conditions so as to maintain good reinforcing effect of the carbon fibers.

The thermosetting resin composition may be molded into articles having the desired shape by using a conventional method, e.g. by using an injection, transfer, or the like molding machine. In order to give molded articles having good dimensional accuracy and dimensional stability, control of the molding temperature is one of important factors as well as the mold accuracy and uniformity of the mold temperature. That is, in order to shorten the molding time as short as possible, the higher mold temperature is better. But when the mold temperature is 10° C. or more higher than the glass transition temperature of the cured resin component used, dimensional accuracy of molded articles is lowered, this being found by the present inventors. Therefore, it is important to make the mold temperature nearer the glass transition temperature of the cured resin component used.

The term "precision machinery components" means precise plastic structure which includes parts of machines and instruments which require high dimensional accuracy and dimensional stability and is to be molded by using the thermosetting resin composition mentioned above. Concrete examples of the precision machinery components are mechanical parts such as gears, cams, arms, bases (chassises), cylinders and the like used in audio and/or video electronic devices or equipment such as tape recorders, audio listening equipment, video tape recorders, cameras for video tape recording, etc., and peripheral devices of computers such as disc devices, printers, etc.

Explanation is given to a magnetic tape scanning apparatus and a sub-chassis used in a video tape recorder. The magnetic tape scanning apparatus generally comprises one or more guide drums which guide magnetic tape to recording and reproducing apparatus and magnetic head which contacts with the sliding magnetic tape. Various types are disclosed as to such an apparatus. For example, U.S. Pat. No. 3,955,215 discloses an apparatus having a rotating magnetic head, which is slightly ejected between upper and lower guide drums at the direction of the radius of the drums, U.S. Pat. No. 3,333,753 discloses a magnetic tape scanning apparatus comprising a lower guide drum and an upper rotating drum equipped with a magnetic head.

Figure 1:
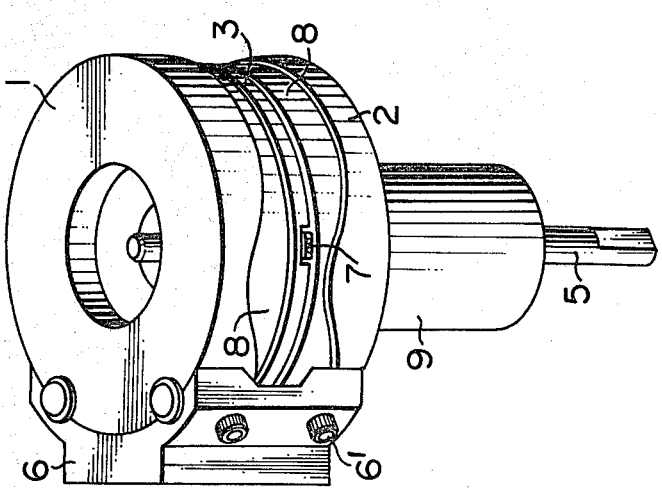
FIG. 1 is a perspective view of magnetic tape scanning apparatus.

FIGS. 1 and 2 show a type of magnetic tape scanning apparatus used in a video tape recorder having rotating circular plate 3 having magnetic head 7 between upper guide drum 1 and lower guide drum 2, said upper guide drum 1 and lower guide drum 2 being fixed on a connector 6 by bolts 6'. The lower guide drum 2 and sleeve 9 are molded into one piece. In the center of the sleeve 9, there is a shaft 5 which rotates the rotating circular plate 3. Rotating transformer 12 is attached to the rotating circular plate 3. Upper portion of the shaft 5 is supported by bearing 11 at the inside of the sleeve 9. The lower guide drum 2 is fixed on substrate 18 via supporting substrate 17. Lower portion of the shaft 5 is supported by bearing 11 at the inside of sleeve 9 and fixed on pulley 14 by a bolt 16. The pulley 14 is rotated by belt 15. The lower guide drum 2 and the upper guide drum 1 have a slightly depressed magnetic tape guiding passage at the surfaces thereof.

The lower guide drum 2 or both the upper and lower guide drums 1 and 2 can be formed by using the thermosetting resin composition mentioned above.

Figure 3:
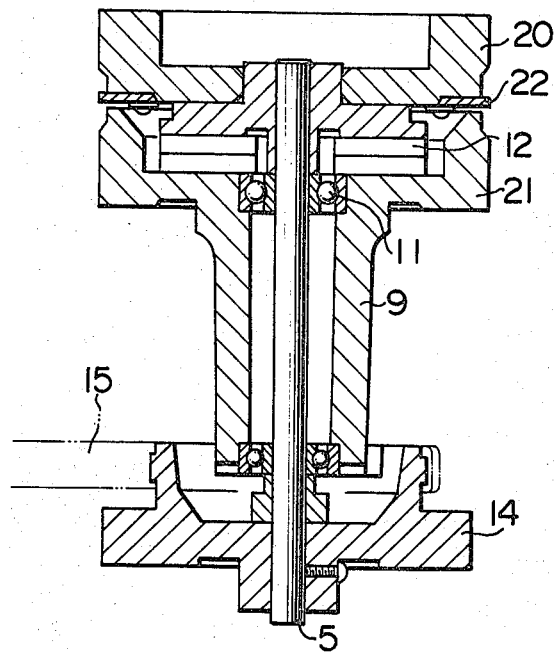

FIG. 3 is a cross sectional view of a type of magnetic tape guide apparatus having guide drum 21 and rotating drum 20 having magnetic head 22 fixed thereon. In FIG. 3, other numerals have the same meaning as used in FIGS. 1 and 2. Portions not referred to numerals in FIG. 3 may be apparent from the corresponding portions shown in FIGS. 1 and 2. In the type of FIG. 3, the guide drum 21 is molded by using the thermosetting resin composition mentioned above. Since the rotating drum 20 requires much more severe dimensional accuracy, it is made of metal.

In molding the guide drum or cylinder, much care should be taken so as to make frictional resistance 0.26 or less when measured under the conditions of magnetic tape of contact load 100 g, running speed 3.3 cm/sec, and running distance 500 km. The frictional resistance can be controlled by adjusting particle size and compounding amount of the inorganic filler to become substantially zero. When the guide drum is molded by using the thermosetting resin composition mentioned above, surface resistance of the guide drum can be reduced to $10^9$ Ω-cm or less, which results in removing undesirable influence of static electricity accumulated on the surface of the guide drum due to friction with magnetic tape.

Further, out of roundness of the guide drum or cylinder should be not more than 10 μm even after heated at 90° C. for 1400 hours. The term "out of roundness" means a width of deviation from the designed size (true circle). Out of roundness of 10 μm or less means that a deviation of the circle of the molded cylinder from the true circle is 10 μm or less. Thus the smaller the value of out of roundness becomes, the more round the circle becomes. Heating conditions of 90° C.×1400 hours are set for an accelerated test considering practical use conditions of video tape recorders. When the value of out of roundness is 10 μm or less under such conditions, the guide drum can practically be useful. FIG. 6 is an example of a result of measuring "out of roundness" of a cylinder as shown in FIG. 5.

Figure 4A:
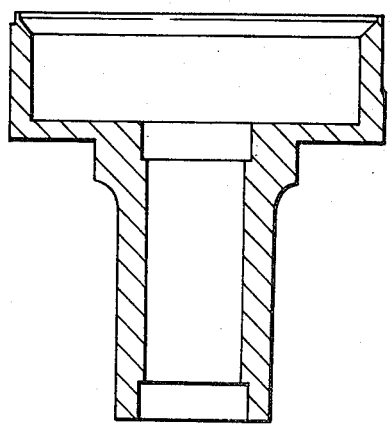
FIGS. 4A, 4B and 5A, 5B show examples of guide drums or cylinders used in a video tape recorder.
Figure 4B:
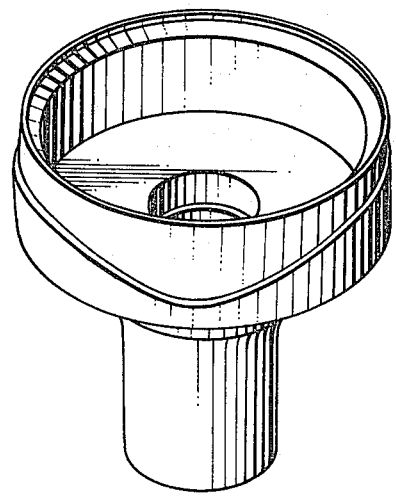
Figure 5A:
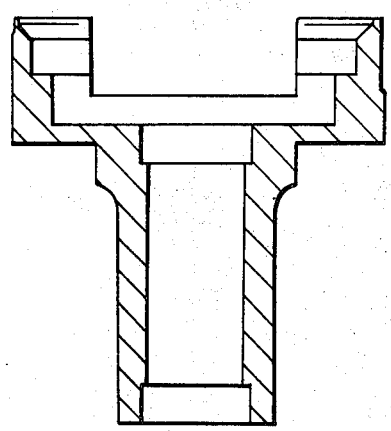
Figure 5B:
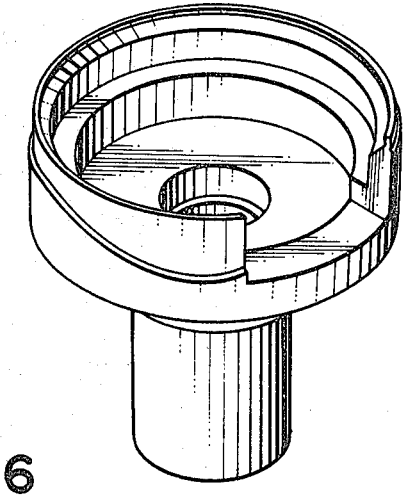
Figure 6:
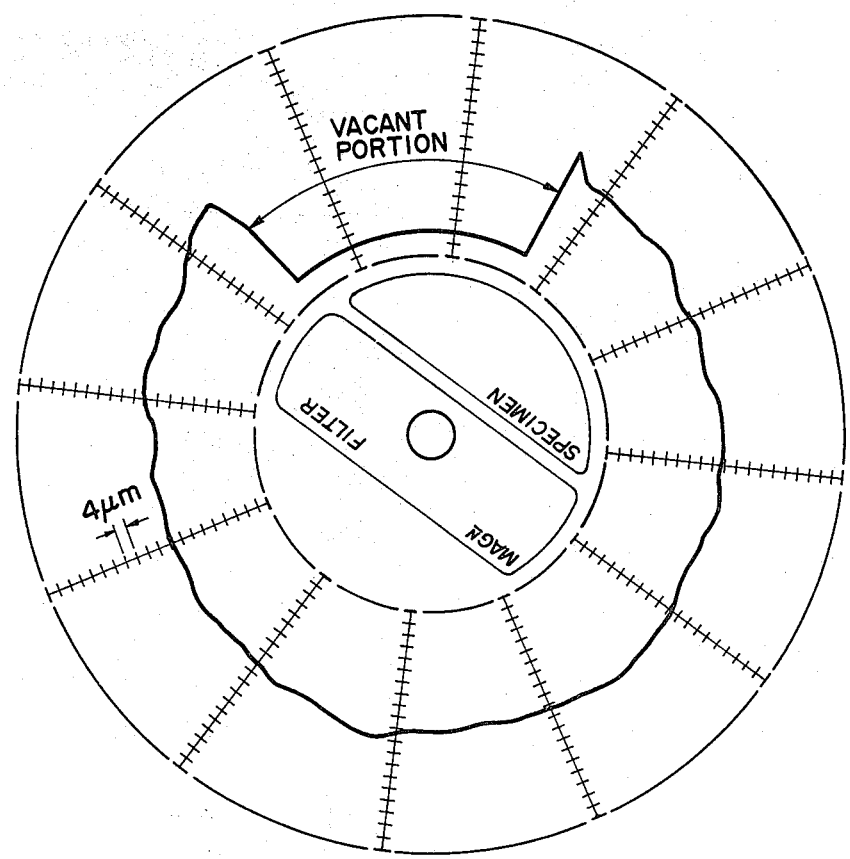
FIG. 6 is an example of a result of measuring "out of roundness" of a cylinder as shown in FIG. 5.

The guide drum or cylinder used in the video tape recorder can take a form as shown in FIG. 4 (a), a cross sectional view, or FIG. 4 (b), a perspective view, having no vacant portion on the upper cylinder wall, or a form as shown in FIG. 5 (a), a cross sectional view, or FIG. 5 (b), a perspective view, having vacant portion on the upper cylinder wall. In the latter case as shown in FIG. 5, higher dimensional accuracy and dimensional stability are required than the former case as shown in FIG. 4. The thermosetting resin composition mentioned above can sufficiently be molded into the cylinder having the form as shown in FIG. 5.

Figure 11:
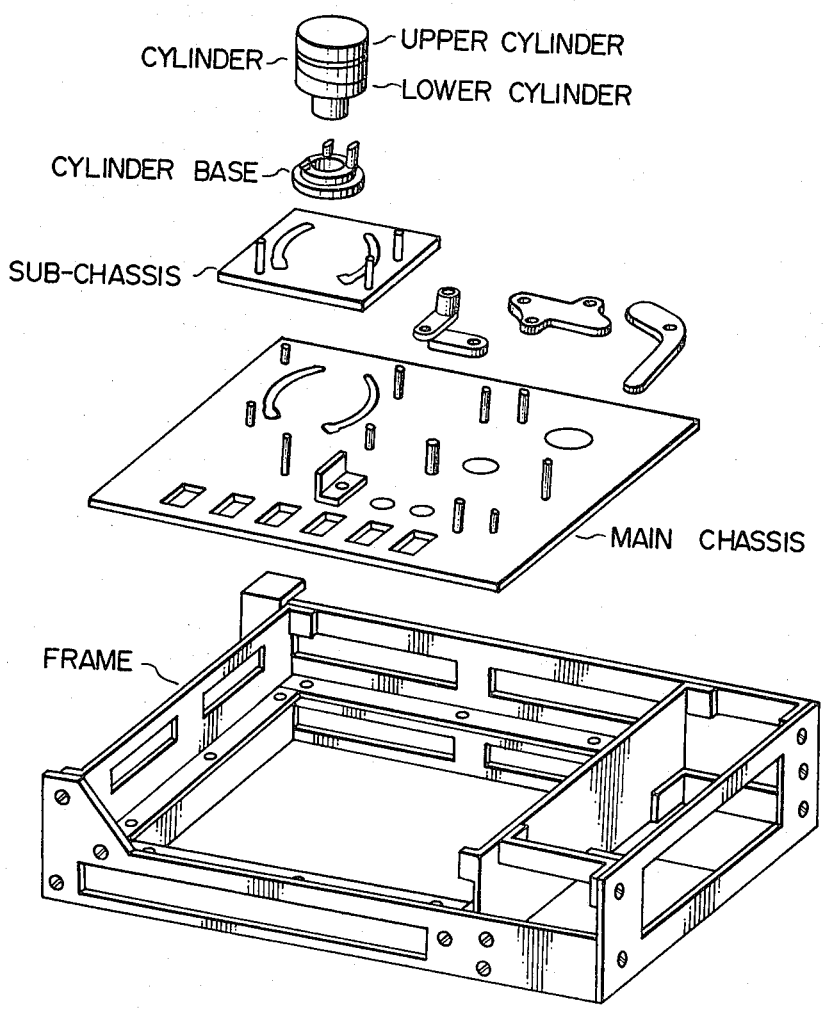
FIG. 11 is an assembly view of main parts consititut- ing a video tape recorder.

The thermosetting resin composition mentioned above is also suitable for molding a sub-chassis used between a cylinder base which is placed below the cylinder and a main chassis, these being used in the video tape recorder usually made of metal as shown in FIG. 11. The sub-chassis also requires dimensional accuracy and dimensional stability. If required, the cylinder base and the sub-chassis can be molded into one piece as shown in FIG. 7 by using the thermosetting resin composition mentioned above.

FIG. 7 (a) is a plan view of the sub-chassis (including cylinder base) and FIG. 7 (b) is a side view of the sub-chassis, wherein numeral 41 denotes a hole inserting the fixing portion of cylinder bearing, numeral 42 denotes the cylinder for video tape recorder (VTR), numeral 43 denotes a cylinder base, numeral 44 denotes zonal hole for tape guide, numeral 45 denotes a boss, and α is an angle made by the cylinder base plane with the plane of sub-chassis (angle of crossed planes).

As mentioned above, the precision machinery components obtained by curing the special thermosetting resin composition mentioned above have so high dimensional accuracy and dimensional stability that they can be used as the cylinder and/or sub-chassis of video tape recorders for weight-saving and reducing production cost without lowering their performance.

This invention is illustrated by way of the following Examples, in which all parts and percents are by weight unless otherwise specified.

REFERENCE EXAMPLES 1 TO 12

Commercially available various phthalic acid series unsaturated polyester resins as listed in Table 1 in an amount of 100 parts, styrene in an amount as listed in Table 1, 1 part of 1,1-bis(t-butylperoxy)3,3,5-trimethyl-cyclohexane as curing catalyst, 200 parts of calcium carbonate having an average particle size of 2.2 μm and 75 parts of silica powder having an average particle size of 0.5 μm as filler, 70 parts of glass short fibers having a length of 6 mm as reinforcing agent, and 5 parts of zinc stearate as releasing agent were kneaded in a kneader to give various molding materials. These molding materials were molded into round rods of 100 mm in length and 10 mm in diameter by using a transfer molding machine under the conditions of molding temperature of 130° C., molding pressure of 75 kg/cm² and molding time of 10 minutes. Individual molded articles were heated with a temperature rise rate of 1° C./min to measure coefficient of thermal expansion and to give glass transition temperature from the inflection point thereof.

As is clear from Table 1, the terephthalic acid series unsaturated polyester resin show the highest glass transition temperature among various phthalic acid series unsaturated polyester resins, i.e. the terephthalic acid series unsaturated polyester resin in excellent in thermal resistance.

TABLE 1

| Reference Example No. | Type of unsaturated polyester resin used | Styrene content (%) | Viscosity (P) of styrene solution of unsaturated polyester resin (25° C.) | Glass transition temperature (°C.) |
|---|---|---|---|---|
| 1 | Phthalic anhydride series | 30 | 10 | 95 |
| 2 | | 30 | 13 | 102 |
| 3 | | 33 | 8 | 82 |
| 4 | | 30 | 23 | 100 |
| 5 | | 30 | 15 | 90 |
| 6 | Isophthalic acid series | 30 | 24 | 98 |
| 7 | | 36 | 28 | 106 |
| 8 | | 29 | 15 | 98 |
| 9 | | 30 | 15 | 128 |
| 10 | | 30 | 17 | 125 |
| 11 | Terephthalic acid series | 40 | 30 | 135 |
| 12 | | 40 | 27 | 140 |

REFERENCE EXAMPLES 13 TO 26

Two kinds of terephthalic acid series unsaturated polyesters containing terephthalic acid and maleic anhydride in a molar ratio of 45/55 or 35/65, each styrene content being 40% were mixed with various thermoplastic resins as listed in Table 2 in a weight ratio of 80:20. Compatibility of each resin was as listed in Table 2. Using these resin components, molding materials were prepared in the same manner as described in Reference Example 1. Mold shrinkage of these molding materials was measured according to JIS-K-6911 using transfer molding conditions of molding temperature of 130° C., molding pressure of 75 kg/cm² and molding time of 10 minutes.

The results are as shown in Table 2. As is clear from Table 2, the saturated polyesters, particularly isophthalic acid series saturated polyester, have excellent compatibility with the terephthalic acid series unsaturated polyester and give remarkably great effect on lowering mold shrinkage.

TABLE 2

| Reference Example No. | Terephthalic acid series polyester resin | Thermoplastic resin | Compatibility*¹ | Mold shrinkage (%) |
|---|---|---|---|---|
| 13 | Molar ratio of terephthalic acid/maleic anhydride = 45/55, styrene content = 40% | — | — | 0.6 |
| 14 | | Polyethylene | Separation of layers | 0.1 |
| 15 | | Polystyrene | Separation of layers | 0.2 |
| 16 | | Polyvinyl acetate | Separation of layers | 0.2 |
| 17 | | Polymethyl methacrylate | Separation of layers | 0.2 |
| 18 | | Modified polyethylene terephthalate | No separation | 0.1 |
| 19 | | Isophthalic acid series saturated polyester | No separation | 0.2 |
| 20 | Molar ratio of terephthalic acid/maleic anhydride = 35/65, styrene content = 40% | — | — | 0.7 |
| 21 | | Polyethylene | Separation of layers | 0.1 |
| 22 | | Polystyrene | Separation of layers | 0.1 |
| 23 | | Polyvinyl acetate | Separation of layers | 0.2 |
| 24 | | Polymethyl methacrylate | Separation of layers | 0.2 |
| 25 | | Modified polyethylene terephthalate | No separation | 0.1 |
| 26 | | Isophthalic acid series saturated polyester | No separation | 0.1 |

(Note)
*¹To a terephthalic acid series unsaturated polyester resin heated at about 100 to 120° C., a thermoplastic resin was added and mixed, cooled naturally and allowed to stand overnight to observe the state of compatibility.

REFERENCE EXAMPLES 27 TO 29

Mold shrinkage of three kinds of commercially available low shrinkage unsaturated polyester resins (containing short glass fibers) was measured according tp JIS-K-6911. Further the cylinder as shown in FIG. 5 for use in a video tape recorder was molded by transfer molding under the conditions of molding temperature of 130° C., molding pressure of 150 kg/cm² and molding time of 10 minutes. Initial value of out of roundness of the cylinder (measuring points being shown in FIG. 6 and expressed as maximum deviation against the true circle) and out of roundness after heated at 90° C. for 30 days was measured and listed in Table 3.

REFERENCE EXAMPLES 30 AND 31

To 100 parts of a mixture of terephthalic acid series unsaturated polyester resin containing terephthalic acid and maleic anhydride in a molar ratio of 35/65 (styrene content 40%) and finely powdered polyethylene in weight ratio of 80/20 or a mixture of the same terephthalic acid series unsaturated polyester resin and an isophthalic acid series saturated polyester in weight ratio of 80/20, 1 part of 1,1-bis(t-butylperoxy)-3,3,5-trymethylcyclohexane, 200 parts of calcium carbonate having an average particle size of 2.2 μm, 75 parts of silica powder having an average particle size of 0.5 μm, 70 parts of glass short fibers having length of 6 mm and 5 parts of zinc stearate were added and kneaded in a kneader to give each molding material. Using these molding materials, mold shrinkage and out of roundess of cylinders were measured in the same manner as described in Reference Example 27. The results are as shown in Table 3.

REFERENCE EXAMPLES 32 AND 33

The procedures of Reference Examples 30 and 31 were repeated except for using carbon short fibers having length of 6 mm in an amount of 50 parts in place of 70 parts of glass short fibers (volume percentages of both fibers being the same). Mold shrinkage and out of roundness were measured in the same manner as described in Reference Example 37. The results are shown in Table 3.

TABLE 3

| Reference Example No. | Mold shrinkage (%) | Out of roundness (μm) | |
|---|---|---|---|
| | | Initial value | After heated at 90° C. for 30 days |
| 27 | 0.1 | 18 | 35 |
| 28 | 0.1 | 20 | 30 |
| 29 | 0.2 | 35 | 55 |
| 30 | 0.1 | 25 | 38 |
| 31 | 0.1 | 15 | 20 |
| 32 | 0.1 | 20 | 22 |
| 33 | 0.1 | 10 | 12 |

As is clear from Table 3, there is a problem in initial value of out of roundness and its stability when the cylinders having the shape as shown in FIG. 5 are molded by using the commercially available molding materials. On the contrary, when a mixture of a terephthalic acid series unsaturated polyester resin and an isophthalic acid series saturated polyester resin is used as the resin component and carbon short fibers are added thereto to give molding materials, there can be attained improvement in the out of roundness and dimensional stability.

EXAMPLES 1 TO 5

To 100 parts of a mixture of a terephthalic acid series unsaturated polyester resin containing terephthalic acid and maleic acid in molar ratio of 35/65 (styrene content 40%) and an isophthalic acid series unsaturated polyester in weight ratio of 80/20, 1 part of 1,1-bis(t-butylperoxy)-3,3,5-trimethylcyclohexane and 5 parts of zinc stearate were added and mixed to give a resin component. The resin component was mixed with a filler (a mixture of calcium carbonate having an average particle size of 2.2 μm and an aluminum hydroxide having an average particle size of 1.0 μm in weight ratio of 70/30) and carbon short fibers having length of 6 mm in proportions as listed in Table 4 in a kneader to give five kinds of molding materials. Using these molding materials, cylinders as shown in FIG. 5 were molded in the same manner as described in Reference Example 27. Mold shrinkage and out of roundness were measured in the same manner as described in Reference Example 27 and the results were listed in Table 4.

As is clear from Table 4, the cylinders molded by using the special molding materials are excellent in dimensional accuracy and dimensional stability.

TABLE 4

| Example No. | Molding material composition (%) | | | Mold shrinkage (%) | Out of roundness (μm) | |
|---|---|---|---|---|---|---|
| | Resin component | Filler | Carbon fibers | | Initial value | After heated at 90° C. for 30 days |
| 1 | 20 | 70 | 10 | 0.1 | 12 | 12 |
| 2 | 25 | 65 | 10 | 0.1 | 10 | 12 |
| 3 | 25 | 70 | 5 | 0.1 | 15 | 16 |
| 4 | 25 | 60 | 15 | 0.1 | 22 | 24 |
| 5 | 30 | 60 | 10 | 0.1 | 12 | 16 |

EXAMPLE 6

The molding material of Example 2 was transfer molded by changing molding temperature as listed in Table 5 under molding pressure of 150 kg/cm² and molding time of 10 minutes into cylinders of FIG. 5. For comparison, the commercially available molding material used in Reference Example 27 was also transfer molded under the same conditions as mentioned above. Mold shrinkage and out of roundness were also measured in the same manner as described in Reference Example 27 and the results were listed in Table 5.

As is clear from Table 5, the molding temperature gives considerably great influence on dimensional accuracy of the molded cylinders. There is a tendency to give better dimensional accuracy around the molding temperature of about 140° C.

TABLE 5

| Molding material | Molding temp. (°C.) | Mold shrinkage (%) | Out of roundness (μm) | |
|---|---|---|---|---|
| | | | Initial value | After heated at 90° C. for 30 days |
| Example 2 | 120 | 0.2 | 16 | 24 |
| | 140 | 0.1 | 8 | 8 |
| | 150 | 0.1 | 16 | 18 |
| | 160 | 0.1 | 36 | 36 |
| Reference Example 27 | 120 | 0.2 | 40 | 60 |
| | 140 | 0.1 | 16 | 20 |
| | 150 | 0.1 | 28 | 36 |
| | 160 | 0.1 | 32 | 36 |

EXAMPLE 7

To 100 parts of a mixture of a terephthalic acid series unsaturated polyester resin containing terephthalic acid and maleic acid in molar ratio of 35/65 (styrene content 50%) and an isophthalic acid series saturated polyester in weight ratio of 80/20, 1 part of 1,1-bis(t-butylperoxy)-3,3,5-trimethylcyclohexane and 5 parts of zinc stearate were added and mixed to give a resin component. The resin component was mixed with a filler (a mixture of calcium carbonate having an average particle size of 2.2 μm and aluminum hydroxide having an average particle size of 1.0 μm in weight ratio of 70/30) in an amount of 65% and carbon short fibers having length of 6 mm in an amount of 10% in a kneader to give a molding material.

Mold shrinkage of the molding material according to JIS-K-6911 was 0.1%.

The guide drum 21 as shown in FIG. 3 was transfer molded by using the molding material mentioned above under the conditions of mold temperature 140° C., molding pressure 150 kg/cm², charging time of the material into the mold about 5 seconds, and curing time 5 minutes. An initial value of out of roundness was 8 μm and out of roundness after heated at 90° C. for 60 days was 10 μm. These results clearly show that the guide drum molded by using the special molding composition has excellent dimensional accuracy and dimensional stability.

EXAMPLE 8

Using the molding material prepared in Example 6, a guide drum as shown in FIG. 3 was molded and relation between the molding temperature (molding pressure 150 kg/cm², molding time 5 minutes) and out of roundness of the initial value and after heated at 90° C. for 60 days was tested. When molded at 140° C., mold shrinkage was 0.1%, an initial value of out of roundness was 8 μm, and out of roundness after the heat treatment was 8 μm. A coefficient of linear expansion was $2.2 \times 10^{-5}/°C$., which value is almost the same as that of rotating drum 20 as shown in FIG. 3 made of an aluminum-silicon alloy.

Glass transition points of the guide drums of Examples 7 and 8 were higher than 90° C. When the running test of magnetic tape was conducted under the conditions of contact load 100 g, running speed 3.3 cm/sec and running distance 500 km, the frictional resistance was 0.24 and no wear was identified after the running test.

When carbon black was used in place of carbon fibers in the above-mentioned molding material, surface resistance was larger than $10\ \Omega$-cm in the case of adding 0 to 5% of carbon black, $10^{13}\ \Omega$-cm in the case of adding 10% of carbon black, $10^8\ \Omega$-cm in the case of adding 30% of carbon black, and $10^6\ \Omega$-cm in the case of adding 50% of carbon black, based on the total weight of the molding material. Since antistatic effect is sufficient when the surface resistance is $10^9\ \Omega$-cm or lower, the addition of carbon black in an amount of 20% is sufficient to attain such an object.

REFERENCE EXAMPLES 34 AND 35

A mixture of 80 parts of a terephthalic acid series unsaturated polyester resin AMS-281 (manufactured by Nippon Upica Co. Ltd., styrene content 31%) and 20 parts of a thermoplastic saturated polyester resin Vylon #300 (manufactured by Toyobo Co., Ltd.) (Reference Example 34), or a mixture of 80 parts of isophthalic acid series unsaturated polyester resin PS-680 (manufactured by Hitachi Chemical Co., Ltd., styrene content 36%) and 20 parts of a thermoplastic saturated polyester resin Vylon #300 (Reference Example 35) was kneaded with the following ingredients:

|  |  | Parts |
|---|---|---|
| Curing catalyst: | 1,1-bis(t-butylperoxy)-3,3,5-trimethylcyclohexane | 1 |
| Filler: | calcium carbonate (average particle size 1.5 μm) | 250 |
|  | finely powdered silica (average particle size 0.1 μm) | 30 |
| Reinforcing material: | glass fibers (length 6 mm) | 70 |
| Releasing agent: | zinc stearate | 3 |
| Colorant: | carbon black | 2 |

REFERENCE EXAMPLES 36 AND 37

A mixture of 80 parts of a terephthalic acid series unsaturated polyester resin AMS-700 (manufactured by Nippon Upica Co., Ltd., styrene content 42%) and 20 parts of a thermoplastic saturated polyester resin Vylon #300 (Reference Example 36), or a mixture of 67.5 parts of AMS-700 and 32.5 parts of a styrene solution of thermoplastic saturated polyester resin Polymer 9755 (manufactured by Takeda Chemical Industries, Ltd., styrene content about 66%, viscosity 16 poises at 25° C.) (Reference Example 37) was kneaded with 1 part of 1,1-bis(t-butylperoxy)-3,3,5-trimethylcyclohexane as curing catalyst, 150 parts of calcium carbonate having an average particle size of 1.5 μm and 30 parts of finely powdered silica having an average particle size of 0.1 μm as filler, 70 parts of glass fibers having length of 0.5 mm as reinforcing material, 3 parts of zinc stearate as releasing agent and 2 parts of carbon black as colorant in a kneader to give each molding material.

EXAMPLES 9 TO 12

A mixture of 80 parts of a terephthalic acid series unsaturated polyester resin AMS-700 (styrene content 42%) and 20 parts of a thermoplastic saturated polyester resin Vylon #300 (Example 9), a mixture of 70 parts of AMS-700 and 30 parts of a styrene solution of thermoplastic saturated polyester resin Polymer 9755 (styrene content 33%) (Example 10), a mixture of 80 parts of isophthalic acid series unsaturated polyester resin Polymer 6709 (manufactured by Takeda Chemical Industries, Ltd., styrene content 30%) and 20 parts of Vylon #300 (Example 11) or a mixture of 70 parts of Polymer 6709 and 30 parts of Polymer 9755 (Example 12) was kneaded with 1 part of 1,1-bis(t-butylperoxy)-3,3,5-trimethylcyclohexane as curing catalyst, 250 parts of calcium carbonate having an average particle size of 1.5 μm and 30 parts of finely powdered silica (average particle size 0.1 μm) as filler, 70 parts of glass fiber of 6 mm long as reinforcing material, 3 parts of zinc stearate as releasing agent, and 2 parts of carbon black as colorant (or antistatic agent) in a kneader to give 4 kinds of molding materials.

Table 6 gives mold shrinkage, thermal expansion coefficient and glass transition temperature of molded articles when the molding materials obtained in Reference Examples 34 to 37 and Examples 9 to 12 were transfer molded at mold temperature of 150° C., molding pressure of 150 kg/cm² and molding time of 5 minutes. Table 7 gives angle of crossed planes of the cylinder base and the sub-chassis, oblique rate of boss and warpage of the whole plane when a cylinder base and a sub-chassis were molded into one piece as shown in FIG. 7. FIG. 8 shows changing rate of boss position and FIG. 9 shows warpage of individual sub-chassises thus molded by using the molding materials of Examples 9 to 12 with the lapse of time when heated at 90° C.

These results clearly show that the sub-chassises according to this invention are excellent in initial dimensional accuracy and dimensional stability when heated.

TABLE 6

| Example No. | Molding shrinkage (%) | Thermal expansion coefficient ($10^{-5}/°C$.) | Glass transition temperature (°C.) |
| --- | --- | --- | --- |
| Reference Example 34 | 0.25 | 2.7 | 92 |
| Reference Example 35 | 0.20 | 2.6 | 80 |
| Reference Example 36 | 0.10 | 3.6 | 122 |
| Reference Example 37 | 0.10 | 4.0 | 118 |
| Example 9 | 0.05 | 2.5 | 121 |
| Example 10 | 0.05 | 2.4 | 120 |
| Example 11 | 0.10 | 2.5 | 110 |
| Example 12 | 0.05 | 2.6 | 109 |

TABLE 7

| Example No. | Angle of crossed planes (standard 12°50′) | Oblique rate of boss (%) | Warpage (mm/140 × 150 mm) |
| --- | --- | --- | --- |
| Reference Example 34 | 12°48′ ± 2′ | 0.22–0.30 | 0.07–0.10 |
| Reference Example 35 | 12°50′ ± 2′ | 0.26–0.35 | 0.08–0.15 |
| Reference Example 36 | 12°49′ ± 2′ | 0.20–0.30 | 0.10–0.20 |
| Reference Example 37 | 12°51′ ± 2′ | 0.18–0.28 | 0.05–0.20 |
| Example 9 | 12°50′ ± 1′ | 0.05–0.10 | 0.02–0.05 |
| Example 10 | 12°49′ ± 1′ | 0.05–0.15 | 0.02–0.06 |
| Example 11 | 12°49′ ± 1′ | 0.05–0.10 | 0.01–0.05 |
| Example 12 | 12°49′ ± 1′ | 0.05–0.08 | 0.03–0.09 |

(Note)
Five samples were used in individual cases.

Figure 10:
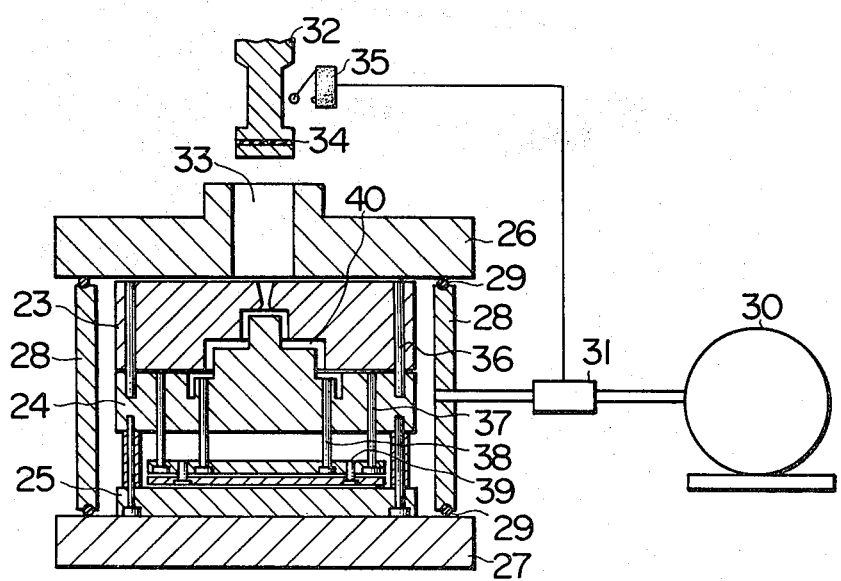
FIG. 10 is a cross sectional view of a transfer molding machine operated under reduced pressure.

In molding precision machinery components or precise plastic structure by using the special thermosetting resin composition, it is more preferable to conduct transfer molding under reduced pressure using the transfer molding machine as shown in FIG. 10, when a transfer molding method is employed.

FIG. 10 is a cross sectional view of a transfer molding machine for molding guide drums as shown in FIG. 5 under reduced pressure. In FIG. 10, numerals 23, 24 and 25 denote molds; numerals 26 and 27 denote clamping plates holding the molds 23, 24 and 25; numeral 28 denotes an airtight surrounding medium (in this case made of steel) for surrounding the molds 23, 24 and 25; numeral 29 denotes a sealing material such as circular rubber ring to easily hold airtightness between the surrounding medium 28 and the clamping plates 26 and 27; numeral 30 denotes a vacuum pump connected to the surrounding medium 28 via a solenoid valve 31; numeral 32 denotes a plunger which presses the molding material held in a pot 33 formed in the clamping plate 26 into the molds; numeral 34 denotes a sealing material made of rubber attached to the top portion of the plunger 32; numeral 35 denotes a switch which is operated by the downward moving of the plunger 32 for operating the solenoid valve 31; numeral 36 denotes a guide pin between the molds 23 and 24; numeral 37 denotes an ejector pin for the molds; numeral 38 denotes an ejector pin for a molded article; numeral 39 denotes fixing screws for the molds; and numeral 40 denotes molding space.

When a guide drum, e.g. as shown in FIG. 5 is molded by using such a transfer molding machine, the molds 23, 24 and 25 which are constructed by using the guide pin 36, the ejector pin 37 for the molds, the ejector pin 38 for a molded article, and the fixing screws 39 for the molds, are placed between the clamping plates 26 and 27 and surrounded by the surrounding medium 28, and under such conditions, the clamping of the molding machine is conducted. On the other hand, the vacuum pump 30 is operated while closing the solenoid valve 31. Subsequently, a necessary amount of molding material is charged in the pot 33 formed in the upper clamping plate 26 and the plunger 32 is pulled down. When the sealing material 34 attached to the top portion of the plunger 32 is inserted in the pot 33 and reached the point in which airtightness of the molding space 40 can be maintained, the switch 35 is operated to open the solenoid valve 31 and the pressure in the airtight room formed by the surrounding medium 28 is reduced. In such a case, since the molds 23, 24 and 25 are placed in the airtight room, the reduction of pressure in the molding space 40 is conducted through the faces of the molds 23, 24 and 25, interstices between the guide pin 36, the ejector pin 37 for the molds, and the ejector pin 38 for a molded article, or interstices between them for a purpose of exhaust. That is, when the molding material held in the spot 33 formed in the clamping plate 26 is pressed into the molding space 40 by pulling down of the plunger 32, since the molding space 40 is always reduced in pressure by the continuous action of the vacuum pump 30, the molding material can sufficiently be filled even in the minute portion of the molds so as to give molded articles having almost no voids and cavities and being excellent in surface properties and dimensional accuracy. Such a molding method is illustrated by way of the following Example 13.

EXAMPLE 13

Two kinds of molding materials as shown in Table 8 were kneaded in a pressure kneader for about 1 hour to give the desired molding materials.

TABLE 8

| | Components | Molding materials A | B |
| --- | --- | --- | --- |
| Resin component | A styrene solution of terephthalic acid series unsaturated polyester resin (AMS-700, manuf. by Nippon Upica Co. Ltd. styrene content 42%) | 75 g (ca. 68 ml) | 75 g (ca. 68 ml) |
| | A styrene solution of isophthalic acid series saturated polyester resin (Polymer 9755, manuf. by Takeda Chemical Industries, Ltd., styrene content 33%) | 25 g (ca. 23 ml) | 25 g (ca. 23 ml) |
| Curing catalyst | 1,1-Bis(t-butylperoxy)-3,3,5-trimethyl-cyclohexane | 1 g | 1 g |
| Filler (or reinforcing material) | Graft carbon (av. particle size 5 μm) | 30 g (ca. 17 ml) | — |
| | Carbon fibers (diameter 8 μm, 1.5 mm long) | — | 30 g (ca. 17 ml) |

TABLE 8-continued

|  | Components | Molding materials A | Molding materials B |
|---|---|---|---|
|  | Molten silica glass powder (av. particle size 1.5 μm) | 260 g (ca. 100 ml) | 260 g (ca. 100 ml) |
|  | Finely powdered silica (av. particle size 0.1 μm) | 10 g (ca. 4 ml) | 20 g (ca. 8 ml) |
| Releasing agent | Zinc stearate | 3 g | 3 g |
| Coupling agent | γ-Methacryloxypropyl trimethoxy silane | 3 g | 3 g |

Using these molding materials, guide drums as shown in FIG. 5 were molded by a conventional transfer molding method and by the special transfer molding method under reduced pressure as mentioned above. Molding conditions were as follows: mold temperature, 140° C.; charge time of a molding material in the mold, 8 to 12 seconds; molding pressure, 150 kg/cm² (pressure at the plunger plane); and molding time, 5 minutes. Dimensional accuracy, surface resistance, friction coefficient, and the like of the molded articles were measured and the results were listed in Table 9.

TABLE 9

| Molding method | Molding material | Appearance | Out of roundness*1 (μm) | Surface resistivity*2 (Ω) | Friction coefficient*3 |
|---|---|---|---|---|---|
| Transfer molding under reduced pressure | A | Good | 6–8 | $2 \times 10^6$–$7 \times 10^6$ | 0.28–0.30 |
|  | B | Good | 8–10 | $6 \times 10^2$–$9 \times 10^2$ | 0.30–0.32 |
| Conventional transfer molding | A | Cavities & voids | 18–20 | $8 \times 10^5$–$4 \times 10^8$ | 0.30–0.35 |
|  | B | Cavities & voids | 16–22 | $4 \times 10^2$–$6 \times 10^3$ | 0.35–0.40 |

(Note)
*1 to *3 Minimum and maximum values among 10 samples were shown.
*1 Diameters were measured by using a measuring device of roundness manufactured by Taylor Hobbson Co. and out of roundness was expressed as differences between the maximum and minimum portions of true diameters.
*2 According to JIS-K-6911.
*3 Friction coefficient against a magnetic tape (polyester film) measured according to ASTM-D-1894.

As is clear from Table 9, when the guide drums molded by the transfer molding under reduced pressure are better in appearance (absence of voids and cavities) and dimensional accuracy (out of roundness in Table 9 being shown as the maximum deviation from the true circle at the contacting surface of the drum with the magnetic tape) than those molded by the conventional transfer molding and have small surface resistivity and friction coefficient as well as these values with remarkably small in deviation among individual molded articles (the number being 10 samples, respectively) and have remarkably good surface appearance.

Further, when a cylinder and a cylinder base-sub-chassis which is molded into one piece are molded by using the special molding material mentioned above and used in a video tape recorder, the resulting VTR picture characteristics satisfy the standard requirements and the same clear picture as obtained in the case of using the parts made of metal in a conventional video tape recorder can be obtained, when observed by the naked eye.

What is claimed is:

1. In a magnetic tape scanning apparatus comprising a magnetic head assembly containing a magnetic head and a tape guide drum, a base supporting said assembly and a chassis fixing said base, the improvement wherein said tape guide drum is made of a cured thermosetting resin composition which contains a reinforcing material and has a glass transition temperature of 90° C. or higher and further wherein said thermosetting resin composition comprises (A) a thermosetting resin, (B) an inorganic filler and (C) an antistatic agent.

2. In the apparatus of claim 1, a further improvement wherein said base supporting said assembly is made of a cured thermosetting resin composition which contains a reinforcing material and has a glass transition temperature of 90 degrees C. or higher.

3. In the apparatus of claim 1, a further improvement wherein said chassis fixing said base is also made of a cured theremosetting resin composition which contains a reinforcing material and has a glass transition temperature of 90 degrees C. or higher.

4. In a video tape recorder comprising:
a tape guide drum,
a tape guide drum base,
a sub-chassis, and
a main chassis,
the improvement wherein the tape guide drum is made of a molded cured thermosetting resin composition which contains a reinforcing material and has a glass transition temperature of 90° C. or higher and further wherein said thermosetting resin composition comprises (A) a thermosetting resin, (B) an inorganic filler and (C) an antistatic agent.

5. In the video tape recorder of claim 4, the further improvement wherein the tape guide base is made of the cured thermosetting resin composition.

6. In the video tape recorder of claim 4, the further improvement wherein the sub-chassis is made of the cured thermosetting resin composition.

7. In the video tape recorder of claim 4, the further improvement wherein the main chassis is made of the cured thermosetting resin composition.

8. In the video tape recorder of claim 4, the further improvement wherein the tape guide base and the sub-chassis are both made of the cured thermosetting resin and are molded combined in one piece.

9. A molded tape guide drum for use in a magnetic tape scanning apparatus, said tape guide drum being made of a cured thermosetting resin composition which contains a reinforcing material and which has a glass transition temperature of 90° C. or higher, wherein the cured thermosetting resin composition further comprises (A) a thermosetting resin, (B) an inorganic filler and (C) an antistatic agent.

10. A molded tape guide drum base supporting a tape guide drum for use in a magnetic tape scanning apparatus, said tape guide drum being made of a cured thermosetting resin composition which contains a reinforcing material and which has a glass transition temperature of 90° C. or higher, wherein the cured thermosetting resin composition further comprises (A) a thermosetting resin, (B) an inorganic filler and (C) an antistatic agent.

11. A molded sub-chassis supporting a tape guide drum base for use in a magnetic tape scanning apparatus, said tape guide drum being made of a cured thermosetting resin composition which contains a reinforcing material and which has a glass transition temperature of 90° C. or higher, wherein the cured thermosetting resin composition further comprises (A) a thermosetting resin, (B) an inorganic filler and (C) an antistatic agent.

12. A sub-chassis and tape guide drum base molded into one piece for use in a magnetic tape scanning apparatus, said one piece sub-chassis and tape guide drum base being made of a cured thermosetting resin composition which contains a reinforcing material and which has a glass transition temperature of 90° C. or higher, wherein the cured thermosetting resin composition further comprises (A) a thermosetting resin, (B) an inorganic filler and (C) an antistatic agent.

13. A molded lower guide drum for use in a magnetic tape scanning apparatus, said tape guide drum being made of a cured thermosetting resin composition which contains a reinforcing material and which has a glass transition temperature of 90° C. or higher, wherein the cured thermosetting resin composition further comprises (A) a thermosetting resin, (B) an inorganic filler and (C) an antistatic agent.

14. A molded upper guide drum for use in a magnetic tape scanning apparatus, said tape guide drum being made of a cured thermosetting resin composition which contains a reinforcing material and which has a glass transition temperature of 90° C. or higher, wherein the cured thermosetting resin composition further comprises (A) a thermosetting resin, (B) an inorganic filler and (C) an antistatic agent.

15. A molding device according to any one of claims 1, 4, or 9–14, wherein the device is molded by transfer molding under reduced pressure.

16. A molded device according to any one of claims 1, 4, or 9–14, wherein the thermosetting resin composition comprises 20 to 30% by weight of the component (A), 60 to 70% by weight of the component (B) and 5 to 15% by weight of the component (C).

17. A molded device according to any one of claims 1, 4, or 9–14, wherein the component (A) of the thermosetting resin composition is a mixture of a terephthalic acid series unsaturated polyester resin, styrene monomer and a saturated polyester resin.

18. A molded device according to claim 17, wherein the saturated polyester resin is an isophthalic acid series polyester resin.

19. A molded device according to claim 17, wherein the weight ratio of the terephthalic acid series unsaturated polyester resin to styrene is within the range of 60/40 to 40/60, a total being 100, and the weight ratio of a mixture of the terephthalic acid series unsaturated polyester and styrene to the saturated polyester resin is within the range of 85/15 to 75/25, a total being 100.

20. A molded device according to any one of claims 1, 4, or 9–14, wherein the inorganic filler has an average particle size of 44 μm or less.

21. A molded device according to any one of claims 1, 4, or 9–14, wherein the component (C) is carbon fibers or a mixture of carbon powder or graphite powder and short fibrous material.

22. A molded device according to any one of claims 1, 4, or 9–14, wherein the component (C) is carbon fibers of 6 mm long or less.

23. A molded device according to any one of claims 1, 4, or 9–14, wherein the thermosetting resin composition comprises 20 to 30% by weight of (A) a thermosetting resin comprising a terephthalic acid series unsaturated polyester resin, styrene and a saturated polyester resin, 60 to 70% by weight of (B) an inorganic filler having an average particle size of 44 μm or less, and 5 to 15% by weight of (C) carbon fibers of 6 mm long or less.

* * * * *